United States Patent [19]

Taylor

[11] 3,788,405

[45] Jan. 29, 1974

[54] PROCESS FOR PLUGGING FORMATIONS

[75] Inventor: James B. Taylor, Calgary, Alberta, Canada

[73] Assignee: Trans-Canada Resources, Ltd., Vancouver, British Columbia, Canada

[22] Filed: Aug. 23, 1971

[21] Appl. No.: 174,086

[52] U.S. Cl. .................... 175/72, 162/148, 175/72
[51] Int. Cl. ............................................. E21b 21/04
[58] Field of Search .. 175/72; 61/36 R; 252/8.5 LC; 162/148

[56] References Cited
UNITED STATES PATENTS

| | | | |
|---|---|---|---|
| 940,969 | 11/1909 | Hinkel | 162/148 |
| 2,128,782 | 8/1938 | Muller et al. | 162/148 |
| 1,751,690 | 3/1930 | Faben | 61/36 R |
| 2,610,149 | 9/1952 | Van Dyke | 252/8.5 LC |
| 2,793,995 | 5/1957 | Twining | 252/8.5 LC |

*Primary Examiner*—Marvin A. Champion
*Assistant Examiner*—Jack E. Ebel
*Attorney, Agent, or Firm*—Stevens, Davis, Miller & Mosher

[57] ABSTRACT

A composition for use in plugging porous strata encountered during the drilling of a wellbore into an underground formation which composition comprises a mixture of straw and chemical wood pulp fibers in a weight ratio of 1:9 to 9:1 as well as a method of plugging said porous strata by adding said mixture to the drilling fluid recirculating through the well bore.

13 Claims, 1 Drawing Figure

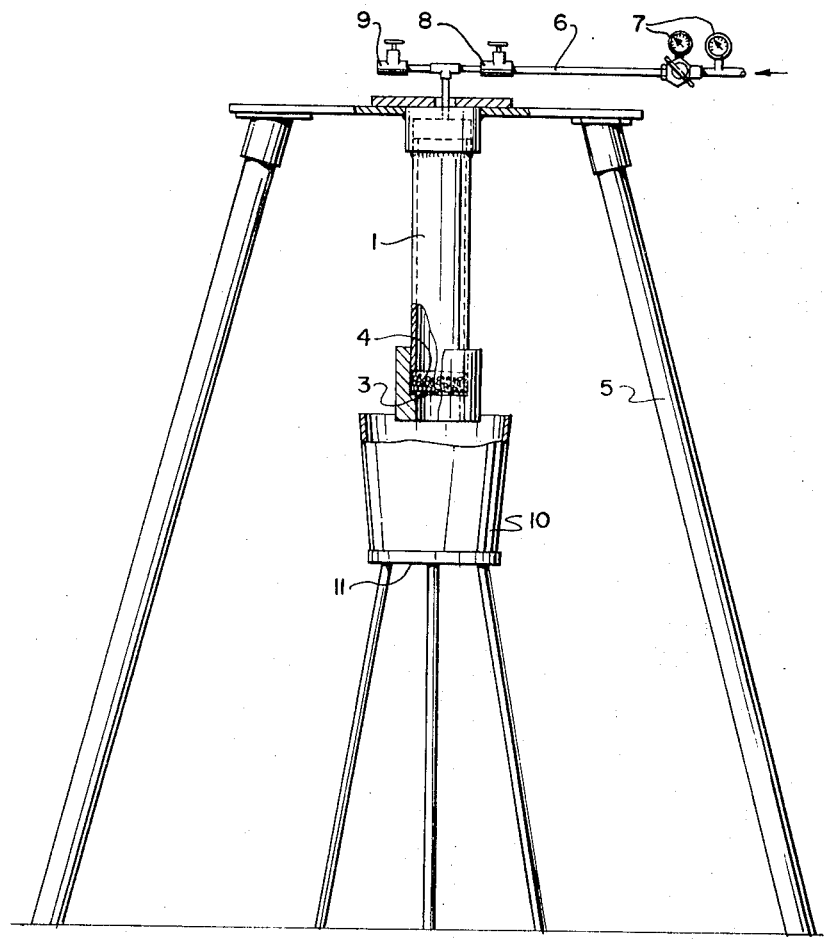

PROCESS FOR PLUGGING FORMATIONS

The present invention relates to the drilling of well bores into underground formations such as the drilling of exploratory or production oil and gas wells in the petroleum industry. In particular the present invention relates to a method of sealing off porosity associated with fractured formations, permeably porous formations, channels and other types of cavernous strata encountered in the drilling of well bores.

In the drilling of bore holes and in particular in the drilling of an exploratory or production well bore hole in the petroleum industry, it is necessary inter alia in order to lubricate and cool the drill bit and associated strings of drill pipe to remove the particulate cuttings, e.g. the rock chips formed by the drill bit in the drilling operation from the bottom of the bore hole to ground level and to maintain a hydraulic pressure in the bore hole which is necessary in preventing or minimizing the risk of blow-out by oil or gas under pressure occurring in the formations penetrated by the drill bit, to continuously circulate a drilling fluid between ground level and the bottom of the bore hole. The drilling fluid thus has a viscosity and is pumped at a velocity sufficient to suspend the particulate cuttings at the bottom of the bore hole therein and carry them to ground level where the fluid is passed into settling devices such as settling tanks with agitation where the particulate material is removed from the drilling fluid which fluid is then recirculated to the bottom of the bore hole for further removal of particulate cuttings therefrom. The drilling fluid is of sufficiently low viscosity such that (a) it will be capable of fluid flow to enable the fluid to be pumped without excessive pressure differentials, (b) it will be sufficiently penetrating to readily reach the bottom of the bore hole during its downward flow to the drill bit and (c) the particular material suspended therein can be readily and quickly settled out therefrom with or without the aid of a mechanical means such as centrifuges and/or chemical means such as flocculating agents. Normally, this drilling fluid consists of a carefully controlled aqueous mixture of various naturally occurring particulate additives in colloidal or substantially colloidal suspension, such as clays, bentonite, chalk and mull which add to the specific gravity of the drilling mud and assist in achieving the aforesaid desired purposes.

When the drill bit during the drilling of the bore hole encounters a porous fractured channeled or cavernous underground formation it is usual for the drilling fluid in the bore hole to be carried off into the voids of the formation with the consequent loss of drilling fluid to the drilling operation and when this condition of "lost circulation" is encountered it is necessary to suspend normal drilling operations until the porosity of the formation has been sealed off, thereby restoring the retention of the drilling fluid once more in the bore hole so that the drilling may continue. Various methods have heretofore been used in restoring circulation which vary to some extend in accordance with the types of porosity encountered. Such methods have included pumping cement in the form of a slurry down the drill pipe into the porous formation. However, this method has not usually been satisfactory because of the large amount of cement required and the setting time necessary before a complete seal off of the porous formation is achieved. Other methods have involved the use of fibrous solid materials such as straw, wood sawdust and shavings which is mixed with the drilling mud and circulated down the drill pipe to attempt to create a mat of fibrous material over the openings of the porous formation and thereby seal off the voids and prevent loss of further drilling fluid into the formation from the well bore. Such methods are disclosed for example in U.S. Pat. Nos. 3,375,888, issued Apr. 2, 1968 to Lomas et al.; 2,812,161 issued Nov. 5th, 1957 to Mayhew; U.S. Pat. No. 3,347,316 issued Oct. 17th, 1967 to Havernar; U.S. Pat. No. 3,363,689 issued Jan. 16, 1968 to Smith et al; U.S. Pat. No. 3,159,217 issued Dec. 1, 1964 to Hanson and U.S. Pat. No. 3,394,757 issued July 30, 1968 to Fisher. However, it is found that while some success has been achieved with such compositions such as for example with the material disclosed in U.S. Pat. No. 3,375,888 and supplied under the trade mark Kwik Seal, the materials have not been found to be effective under most conditions obtaining in the well bore. In particular the material Kwik Seal has the formulation by weight 40 percent lint of fibrous material, 25 percent walnut balls, 15 percent wood shavings and 10 percent cellophane plus small amounts of straw, string and rubber.

The present invention provides a method of plugging porous formations in the drilling of a well bore by adding to the drilling fluid when the porous formation is encountered by the drill bit, a particular mixture of a particular material which mixture is found to be highly successful under normal conditions found in drilling well bores, which mixture quickly and efficiently reduces lost circulation through the porous formation, be it a gravel formation, a fissured formation, a vugular formation or a fractured formation.

It has now been found that the addition to the drilling fluid of a mixture of straw and a chemical wood pulp in the weight ratio of 9:1 to 1:9 and particularly those mixtures in which the straw has an even particle size distribution range from 2 inches down to dust, is highly efficient in sealing all porous formations encountered in drilling well bores. Dust is defined as passing through 325 U.S. Standard Mesh.

According to the present invention therefor there is provided a composition for use in plugging porous strata encountered during the drilling of a well bore into an underground formation which composition comprises a mixture of straw and a chemical wood pulp in a weight ratio of 1:9 to 9:1.

The present invention also provides in the drilling of a well bore into an underground formation which includes recirculating drilling fluids through said well bore, a method of plugging porous strata encountered during said drilling which comprises adding to the drilling fluid a mixture of straw and chemical wood pulp in a weight ratio of 1:9 to 9:1, said mixture being added in an amount sufficient to form a mat on the wall of the well bore adjacent the porous strata to seal said porous strata against passage of fluid therethrough. The method thus involves adding suitable quantities of a mixture of straw and chemical wood pulp to the drilling fluid and circulating the mixthus obtained down the drill pipe into the well bore where it is carried along the bore to the porous formation and which lost circulation is occurring where it forms a mat coating on the wall of the porous formation.

It is highly desirable for the straw of the mixture to have an even particle size distribution e.g., 1½ inches in length down to dust, e.g., 325 U.S. standard mesh. Such a mixture has been found to be highly successful in sealing porous formations where other known solid additives have failed. It is believed that the results obtained with the mixture according to the present invention are due to the particular size distribution of the straw and the characteristics of the wood pulp, in that the two materials appear to have the ability to cling together to form a tight mat. The mixture thus has the ability to seal off porous formations by forming a mat in the formation opening and the straw seals the opening in the mat. It is however within the scope of the present invention that straw of between 2 to 4 inches in length can be present in the mixture to extend the particle size distribution. Thus, the best seals are obtained from straw having an even particle size distribution curve from 1 to 1½ inches down to dust. Depending upon the type of porous formation encountered, it has been found that straw from various types of plants will perform satisfactorily. Because of the large volumes of straw required in the process of the present invention, straw from plants of the more common varieties such as flax, oats and barley are preferred with wheat straw being particularly preferred. However, it is to be understood that the process of the present invention is not restricted to the use of straw of these types of plants and it is intended to include all types of plant fibers. The straw may be blended with other plant products providing the product has the correct particle size distribution such as rolled oats, oat hulls, material from grain cleaning mills and by products from feed mills.

It is a critical feature of the present invention that the cellulosic material admixed with the straw is a chemical wood pulp fiber material as it is the peculiar characteristic of the chemical wood pulp which give it the ability to bind and hold together the straw to form a good seal. Of the chemical wood pulps, clarifier underflow has been found to be the most effective, clarifier underflow being a waste product from a conventional pulp mill.

In normal drilling practice when drilling fluid circulation is lost in the well bore a study is made of the well log in order to determine the extent of the porosity in the encountered porous formation so that an estimate may be made of the amount of the mixture of straw and wood fibers required in order to effect a seal in the formation. The amount of the mixture is then prepared and pumped through the drill stem to the bottom of the hole under pressure where it falls down its hydraulic gradient to the location of the porous formation. It is believed that on the fluid encountering the porous formation, the pulp wood fibers carried in the fluids start to accumulate around the edges of the porosity and where the caverns are large, subsequent pulp fibers will tend to slide across and build up over the underlying wood pulp fibers first deposited until a mat of pulp fibers is accumulated over the face of the porous formation. The straw component of the mixture collects on this mat and seals the opening in the wood pulp fiber mat. Thus, in order to obtain a complete seal, the straw should have an even distribution of particle size down to and including particles less than 325 mesh. The larger straw particles ½ to 1½ inch are necessary to provide structural strength to the mat making it capable of withstanding significant hydrostatic pressure from the fluids encountered in the well bore. Particles of straw in the range 2 to 4 inches in length also help in giving strength to the mat. After the porous formation has been effectively sealed off normal drilling fluid circulation is resumed and the drilling of the well bore continued. It is found that the mixture of straw and chemical wood pulp fibers in accordance with the present invention is compatible with all normal drilling fluids (muds) including low solids gel, dispersed gel, C.S.I., invert and oil-based muds. The mixture does not cause any detrimental effects such as loss of stability in any of these muds.

The mixture as aforesaid is added to the drilling fluid in an amount sufficient to form a mat on the wall of the well bore adjacent the porous strata to seal the porous strata against passage of fluids therethrough. Suitably the mixture is added to the fluid in an amount from 0.01 weight percent to 10 weight percent based on the total weight of the fluid admixture. Thus, suitably the mixture is added to the drilling fluid in an amount from 2 to 30 and more preferably in an amount from 5 to 25 lbs. per barrel. A barrel being a volumetric unit of measure used in the petroleum industry consisting of 42 gallons. In a situation where drilling fluid lost to the formation is fairly slow, the mixture can be added to the mud in concentrations from about 2 to 8 lbs. and preferably 5 to 8 lbs. per barrel and drilling continued while the fluid loss is being stopped. In the case of complete drilling fluid loss the mixture is added to fresh drilling fluid in the tanks in a concentration from about 10 to 30 and preferably 10 to 25 lbs. per barrel depending on the fluid type and viscosity. This mixture is then pumped through the drill string to the section of the hole where the porous formation is believed to be located. The percentage mixtures by weight or volume of the mixture and calculated volume of drilling fluid can be tabulated for area development and drilling programmes and after knowledge of specific loss circulation zones has been gained through actual exploratory drilling. Experience in each geological area gained through drilling will dictate the drilling fluid program in the area.

The relative proportions of straw and chemical wood pulp in the composition may vary from 1 to 9 to 9:1 preferably varies from about 1:3 to 3:1 and more preferably is about 1:1.

It is necessary that some other means of straining cuttings out of the drilling fluid be bypassed upon addition of the mixture to the drilling fluid. In the case of prolonged use or where high bottom hole temperatures exist the addition of a preservative such as is used in the preparation of starch mud should desirably be added to the fluid in order to prevent deterioration of the mixture.

The present invention will be further illustrated by way of the following Examples in conjunction with the accompanying drawing, which drawing shows a test cell for simulating various structures of the porous formation encountered in drilling a well bore.

The only accurate evaluation of a composition for plugging formations hereinafter referred to as a lost circulation material is how well it performs downhole. The effectiveness of the lost circulation material can be determined from laboratory tests by comparison with a field proven lost circulation material.

In the Examples a lost circulation material according to various embodiments of the present invention, alled INTERLOK is compared in a lab study to a field proven lost circulation material supplied under the trade mark KWIK SEAL as well as other plant products including wood by products.

Since the exact nature of the formation causing the lost circulation is rarely known, laboratory tests must be used to simulate loss zones. These tests were carried out in a test cell shown in the drawings.

Referring to the drawing, the test cell comprises a 4 inch diameter, 14 inch long high pressure pipe 1, at the lower end of which is a 4 inch to 3 inch reducer 2 which holds a 3 inch diameter plate 3 for supporting the bed 4 which simulates a particular type of porous formation against which the composition is to be tested. The pipe 1 which is supported from a stand 5 forms the drilling mud reservoir and is supplied with air under high pressure suitably a pressure up to 1,000 psig from a source (not shown) through line 6 via pressure regulator 7 and intake valve 8. Line 6 also includes a vent valve 9. The mud passing through the bed is collected in collector trough 10 on stand 11.

In the following Examples the following obtain.
DEFINITIONS:
1. BARREL — A Barrel is a volumetive unit of measurement used in the Petroleum Industry, consisting of 42 (U.S.) Gallons. One Barrel of water 42 (U.S.) Gallons weighs 350 pounds and is simulated in the laboratory by 350 mls (gms) of fluid. Hence, 15 grams of material when added to 350 mls of fluid, is equivalent to 15 pounds of material when added to one 42 U.S. Gallon Barrel of fluid.
2. 8% GEL — A solution containing 8% Bentonite in water.
3. 4% GEL DV-68 — A solution containing 4% Bentonite with an additive (DV-68) to increase the viscosity. DV-68 is a polyacrylate polymer.
4. HIGH WATER LOSS MUD — A fluid which has an A.P.I. Fluid Loss in the range of 15–20 ml.
5. HIGH SOLIDS MUD — A fluid which contains 6% – 8% solids (Bentonite or shale).
6. INVERT MUD — An Oil Based Emulsion fluid which contains 10% – 15% water.
7. CSI — Fluid containing sodium silicate, disodium pyrophosphate, and sodium carboxymethyl cellulose.
8. KWIK SEAL — A trade mark for a blend as follows:
   40% Lent of fibrous material
   25% Walnut Hulls
   15% Wood Shavings
   10% Cellophane
   Trace amounts of Straw, String and Rubber.
9. CLARIFIER UNDERFLOW — Chemical Wood Pulp
10. XC-POLYMER — High molecular weight organic polymer used to viscosify water and drilling muds.
11. GEL/PELTEX — A drilling mud that has been dispersed (Viscosity lowered), by the addition of a lignosulfonate (Peltex).

PARTICLE SIZE DEFINITION

Unless otherwise stated, the particle size definitions are as follows:
Fine — 20 mesh and smaller
Medium — 8–20 mesh
Coarse — Larger than 8 mesh Thus a particle having a 20 mesh particle size is capable of passing through a 20 mesh screen.

particle size definitions involving straw and underflow in Interlok: all definitions apertaining to straw particle size.

a. Fine: fine particle sized straw is that obtained from a Hammer Mill containing 3/16 inch screens.

b. Medium: Medium particle sized straw is that obtained from a Hammer Mill containing 1 inch screens.

c. Coarse: "Coarse particle sized straw" is that obtained from a Hammer Mill containing 2 inches screens.

d. Super Coarse: Super Coarse particle sized straw is that obtained from a Hammer Mill container 4 inches screen.

The term 'blend' refers to 1:1 mixtures, by weight approximately, of straw and underflow. Fine blend Interlok contains an even particle sized distribution from ¼ inch down to dust. Coarse blend Interlok contains an even particle sized distribution from 2 inches down to dust. Super coarse blend Interlok contains an even particle sized distribution from 4 inches down to dust. Dust is defined as particles passing through a U.S. 325 mesh.

Thus, a 1:1 mixture of underflow and coarse particle sized straw is not the same mixture as coarse blend Interlok. Coarse blend Interlok contains an even particle sized distribution from 2 inches down to dust; and contains equal amounts, by approximate volume, of fine, medium and coarse particle sized straw.

The abbreviation FMC used in describing the particle size distribution of straw means that the straw mixture contains equal amounts by volume of Fine, Medium and Coarse particle sized straw.

The particle size definitions of the material in Kwik Seal lost circulation material are from the size definitions describing commercially available samples of 'Kwik Seal'.

Formations were simulated in the test cell inside the 4 inches diameter pipe 1 by means of the sphere, slot and wedge tests as described hereinbelow.

a. SPHERE TEST

Gravel-type formations were simulated by placing different diameter marbles (spheres) into the high-pressure pipe 1 to form a bed of spheres. Formations representing gravel, pea gravel and sand were simulated by placing 15.0 mm diameter marbles, 10.5 mm diameter marbles and 3.0 mm marbles (buckshot) respectively in the test cell. The bed of marbles was approximately 2 inches high. The test itself consisted of placing 8 barrel equivalents of 15 lbs./barrel lost circulation material in 4 percent extended gel into the cell reservoir pipe 1. The cell was pressured to 250 psi and the amount of fluid flowing through the sphere bed, before the formation of an effective seal by the lost circulation material, was measured. This volume is designated "surge volume" and is collected in the period 4 seconds to 25 seconds after the application of the applied pressure. The volume of mud flowing through the sphere bed in the period 5 minutes after the application of the applied pressure is designated "total volume."

The "total volume" gives an indication of the seepage of fluid (mud) through the plug of lost circulation material and into the formation. The "surge volume" gives an indication of the rate of formation of the plug formed by the lost circulation material. The term "plug" refers to the total layer of lost circulation material formed. The term "seal" refers to the layer of lost circulation material formed between the spheres and the term "mat" refers to the layer of lost circulation material formed above the spheres.

On dismantling the test cell at the conclusion of the experiment, a visual inspection of the strength and appearance of the plug formed by the lost circulation material was made. This latter procedure gives an indication of where the plug is formed by the lost circulation material in a gravel type formation viz: inside the formation; a mat on top or no seal at all. The visual inspection also provides information concerning the strength of the plug formed.

A fairly large cross section of common lost circulation materials were tested with the sphere test. The results are shown in Table I.

TABLE I

| Lost Circulation Material (LCM) | Particle Size Of LCM | Conc. of LCM lbs/bbls. | Sphere Diameter MM | Surge Volume bbls equiv. | Total Volume bbls. equiv. | Seal Thickness In Inches | Mat. Thickness In Inches | Comments |
|---|---|---|---|---|---|---|---|---|
| GRANULAR | | | | | | | | |
| Nutshells | Fine | 15 | 3 | 8 | 8 | 1¼ | 1 | Weak Seal & Mat. No plug formed |
| | Fine | 15 | 10.5 | 8 | 8 | 2+ | - | " |
| | Fine | 15 | 15 | 8 | 8 | 2+ | - | " |
| | Medium | 15 | 3 | 8 | 8 | 3/4 | 1½ | " |
| | Medium | 15 | 10.5 | 8 | 8 | 2+ | ½ | " |
| | Medium | 15 | 15 | 8 | 8 | 2+ | - | " |
| | Coarse | 15 | 3 | 8 | 8 | ½ | 2 | " |
| | Coarse | 15 | 10.5 | 8 | 8 | 2+ | 1 | " |
| | Coarse | 15 | 15 | 8 | 8 | 2+ | ½ | " |
| Sawdust | Fine | 20 | 3 | 4 | 6 | 3/4 | 3/4 | Hard seal & Mat. Plug formed |
| | Fine | 20 | 10.5 | 8 | 8 | 2+ | - | Weak seal & Mat. No plug formed |
| | Fine | 20 | 15 | 8 | 8 | 2+ | - | |
| | Medium | 20 | 3 | 8 | 8 | 0 | 2 | |
| | Medium | 20 | 10.5 | 8 | 8 | 1 | 2 | " |
| | Medium | 20 | 15 | 8 | 8 | 1½ | 2 | " |
| | Coarse | 20 | 3 | 8 | 8 | 0 | 3 | " |
| | Coarse | 20 | 10.5 | 8 | 8 | 0 | 3 | " |
| | Coarse | 20 | 15 | 8 | 8 | 1 | 2 | " |
| Rubber | Fine | 15 | 3 | 8 | 8 | 2+ | | No seal or Mat No Plug formed |

TABLE I Continued

| Lost Circulation Material LCM | Particle Size Of LCM | Conc. Of LCM lbs/bbls. | Sphere Diameter MM | Surge Volume bbls. equiv. | Total Volume bbls. equiv. | Seal | Mat. Thickness In Inches | Comments |
|---|---|---|---|---|---|---|---|---|
| FIBRE | | | | | | | | |
| Wheat Straw | Fine | 15 | 3 | 2 | 3½ | ½ | 1 3/4 | Hard low leak |
| | Coarse | 20 | 15 | 3 | 4½ | 2 | 1 | Seal medium Mat. Plug formed |
| Asbestos | Fine | 15 | 3 | 8 | 8 | 2+ | - | No seal or Mat. No plug formed |
| Redwood Fibre | Coarse | 15 | 15 | 8 | 8 | ½ | 3 | Weak seal & mat. No plug formed |
| FLAKE | | | | | | | | |
| Wood Shavings | Coarse | 15 | 3 | 8 | 8 | 0 | 5 | Weak Seal & Mat No plug formed |
| | Coarse | 15 | 10.5 | 8 | 8 | ¼ | 5 | " |
| | Coarse | 15 | 15 | 8 | 8 | ½ | 5 | " |
| Sunflower Seed Shells | Coarse | 15 | 3 | 8 | 8 | ¼ | 2 | Weak Seal & Mat No plug formed |
| | Coarse | 15 | 10.5 | 8 | 8 | 1½ | 2 | " |
| | Coarse | 15 | 15 | 8 | 8 | 2+ | 1 | " |
| Poly Seal | Coarse | 15 | 3 | 8 | 8 | ¼ | 3 | Weak Seal & Mat No plug formed |
| | Coarse | 15 | 10.5 | 8 | 8 | ¼ | 3 | " |
| | Coarse | 15 | 15 | 8 | 8 | 1 | 3 | " |
| Master Seal | Coarse | 15 | 10.5 | 8 | 8 | 1½ | 2 | Weak Seal & Mat No plug formed |
| Pheno Seal | Coarse | 15 | 15 | 8 | 8 | 2+ | ½ | Weak Seal&Mat. No plug formed |
| Vermiculite | Fine | 15 | 3 | 8 | 8 | 2+ | - | No Seal&MAt. or Plug formed |
| | Medium | 15 | 10.5 | 8 | 8 | 2+ | - | |
| | Coarse | 15 | 15 | 8 | 8 | 2+ | - | |

TABLE I    CONTINUED

| Lost Circulation Material (LCM) | Particle Size of LCM | Conc. of LCM lbs./Bbl | Sphere Diameter M.M. | Surge Volume Bbls. equiv. | Total Volume Bbls. equiv. | Thickness in Inches Seal | Thickness in Inches Mat | Comments |
|---|---|---|---|---|---|---|---|---|
| Oyster Shell | Fine | 30 | 3 | 8 | 8 | 1½ | 3/4 | Weak Seal & Mat. No plug formed |
| Kwik Seal | Fine | 15 | 3 | ¼ | 1 | ½ | 1/8 | Hard mat. & seal Little leakage |
|  | Fine | 15 | 10.5 | 8 | 8 | - | 2+ | No mat or seal |
|  | Fine | 15 | 15 | 8 | 8 | - | 2+ | No mat. or seal |
|  | Medium | 15 | 3 | ¼ | 1 | ½ | 1/8 | Hard mat. & seal Little leakage |
|  | Medium | 15 | 10.5 | 2 | 4¼ | 1 | 1½ | Medium mat. & seal |
|  | Medium | 15 | 15 | 5 | 8 | 1 | 2 | Weak mat. & seal |
|  | Coarse | 15 | 3 | ¼ | 1 | 1 | 1/8 | Hard mat. & seal Little leakage |
|  | Coarse | 15 | 10.5 | 2 | 4 | 1½ | 1½ | Medium mat. & seal |
|  | Coarse | 15 | 15 | 5 | 8 | 1 | 2+ | Weak seal & mat. |
|  | Coarse | 20 | 22 | 8 | 8 | - | 2+ | No mat or seal |
| Woodchips | Coarse | 7 ) | 10.5 | 8 | 8 | 1½ | 1 | Weak seal & mat. No Plug formed |
|  | Fine | 4 ) |  |  |  |  |  |  |
|  | Medium | 4 ) |  |  |  |  |  |  |
| Flax seed |  | 10 | 10.5 | 8 | 8 | 2+ | - | No plug seal & mat |
| Sawdust | Fine | 10 |  |  |  |  |  |  |
| Wood chips | Coarse | 7.5 | 10.5 | 4 | 6 | 1½ | 2 | High leakage Poor plug |
| Sawdust | Fine |  |  |  |  |  |  |  |
| CLARIFIER Underflow |  | 7.5 ) | 10.5 | 2¼ | 4¼ | 1 | 1 | Good Seal & Mat Fair Plug |
| Walnut Husks | Medium | 1.2 ) |  |  |  |  |  |  |
| Poly Seal |  | 1.8 ) |  |  |  |  |  |  |
| Sawdust | Fine | 2.5 ) |  |  |  |  |  |  |
| Cane Fibre |  | 2 ) |  |  |  |  |  |  |

TABLE I CONTINUED

| Lost Circulation Material (LCM) | Particle Size of LCM | Conc. of LCM lbs./Bbl. | Sphere Diameter M.M. | Surge Volume Bbls. Equiv. | Total Volume Bbls. Equiv. | Thickness in Inches Seal | Thickness in Inches Mat | Comments |
|---|---|---|---|---|---|---|---|---|
| Wetlap<br>Sawdust | Medium | 10 )<br>5 ) | 10.5 | 1 | 2¼ | 1 3/4 | ½ | Good plugging<br>Poor mat |
| CLARIFIER Underflow<br>Sawdust | Medium | 10 )<br>)<br>5 ) | 3 | ½ | 1 | 1/8 | ½ | Good seal &<br>Mat - Good<br>Plug |
| CLARIFIER Underflow<br>Woodshavings | Coarse | 7.5<br>7.5 | 15 | 4 | 7 | 2 | ½ | High leakage<br>Poor mat |
| CLARIFIER Underflow<br>Straw<br>Woodshavings | Coarse<br>" | 7.5 )<br>)<br>7.5 )<br>)<br>3.75 ) | 15 | 2 | 3 3/4 | 1 | 1½ | Weak Mat |
| Blended Straw | Dust<br>Fine<br>Coarse | 10 )<br>)<br>5 )<br>)<br>5 ) | 15 | 3 | 4½ | 2 | 1 | Good seal &<br>Mat<br>Good plug |
| Mattress Felt<br>Straw | Coarse | 3 )<br>)<br>10 ) | 15 | 5 | 6 | ¼ | 4 | Weak seal &<br>Thick Mat |
| CLARIFIER Underflow<br>Sawdust<br>Straw<br>Cellophane | Chips<br>Coarse | 5 )<br>2½ )<br>5 )<br>2½ ) | 15 | 2 | 5 | 2 | 2½ | High leakage<br>Weak Mat |
| CLARIFIER Underflow<br>Straw<br>Nutshells | Coarse | 11 )<br>3 )<br>1 ) | 15 | 2 | 4½ | 1½ | 1 | Good Plug |

TABLE I CONTINUED

| Lost Circulation Material (LCM) | Particle Size Of LCM | Conc. of LCM lbs/bbls. | Sphere Diameter MM | Surge Volume bbls equiv. | Total Volume bbls. equiv. | Seal Thickness In Inches | Mat. Thickness In Inches | Comments |
|---|---|---|---|---|---|---|---|---|
| INTERLOK Clarifier Underflow | | 7.5 | | | | | | |
| Straw | Fine | 3.75 | 15 | 2 | 4 | 1½ | 1½ | Good Plug Mat & Seal |
| | Medium | 3.75 | | | | | | |
| Clarifier Underflow | | 5 | | | | | | |
| Straw | Fine | 10 | 15 | 4 | 4½ | 3/4 | 2 | Mat Too Thick |
| | Coarse | 5 | | | | | | |
| Clarifier Underflow | | 5 | | | | | | |
| Straw | Fine | 5 | 15 | 4 | 4½ | 2 | 1 | Seal Too Weak |
| | Medium | 5 | | | | | | |
| | Coarse | 5 | | | | | | |
| Clarifier Underflow | | 5 | | | | | | |
| Straw | Medium | 5 | 15 | 4 | 6 | 1½ | 1½ | Good Mat & Seal. High Leakage |
| Clarifier Underflow | | 5 | | | | | | |
| Straw | Super Coarse | 5 | 15 | 8 | 8 | ½ | 2 | Mat Too Thick Poor Seal |
| Clarifier Underflow | | 6.25 | | | | | | |
| Straw | Medium | 6.25 | | | | | | |
| | Coarse | 2.5 | 15 | 2.5 | 5 | 1½ | 2 | Fair Plug. High Leakage |
| Interlok | FMC | 5 | 15 | 1 | 3½ | 1½ | 1 | Mat Thin |
| Interlok | FMC | 10 | 15 | 1 | 2½ | ½ | 2 | Mat Thick Seal Thin |

TABLE I CONTINUED

| Lost Circulation Material (LCM) | Particle Size of LCM | Conc. of LCM llbs/bbl. | Sphere Diameter MM | Surge Volume bbls. equiv. | Total Volume bbls. equiv. | Seal Thickness In Inches | Mat Thickness In Inches | Comments. |
|---|---|---|---|---|---|---|---|---|
| Interlok | FMC | 7.5 | 15 | 1 | 3 | 1 | 1½ | Good Mat & Seal |
| Interlok | Coarse Blend | 15 | 3 | 1/3 | 1¼ | 1/8 | 2 | Thick Mat Good Plug |
| Interlok | Coarse Blend | 15 | 10.5 | 1¼ | 2 3/4 | ½ | 2 | Good Plug |
| Interlok | Coarse Blend | 15 | 15 | 2 | 3 | 1 | 2 | Good Plug |
| Interlok In 8% Gel | Coarse Blend | 25 | 22 | 4 | 5 | 1½ | 2 | Good Plug |
| Interlok | Fine Blend | 15 | 3 | 1/3 | 1¼ | 1/8 | ½ | Good Plug |
| Interlok In Gel/Peltex | Coarse Blend | 5 | 3 | 6 | 7 | ½ | 1 | Too Thin Seal & Mat High Leakage |

TABLE I CONTINUED

| Lost Circulation Material (LCM) | Particle Size of LCM | Conc. of LCM llbs/bbl. | Sphere Diameter MM | Surge Volume bbls. equiv. | Total Volume bbls. equiv. | Seal Mat Thickness In Inches | | Comments. |
|---|---|---|---|---|---|---|---|---|
| Interlok In Gel/Peltex | Coarse Blend | 10 | 3 | 3 | 4 | ½ | 2 | Fair Seal & Mat.Good Plug |
| Interlok In Gel/Peltex | Coarse Blend | 20 | 3 | ? | 3 | ½ | 3 | Good Seal & Mat.Good Plug |
| Interlok In 6% Gel &2# Lime | Coarse Blend | 20 | 22 | 4 | 5 | 1½ | 2 | Good Plug |
| Interlok In 3% Gel & DV-68 | Coarse Blend | 15 | 15 | 4 | 8 | 1 | 2 | Very High Leakage, Weak Seal. |
| Interlok In Viscosified CSI | Coarse Blend | 15 | 15 | 2 | 4 | 1½ | ½ | Good Plug |
| Interlok In XC Polymer 10% Solids | Coarse Blend | 15 | 15 | 2 | 4 | 1½ | 1 | Good Plug |

TABLE I CONTINUED

| Lost Circulation Material LCM | Particle Size of LCM | Conc. of LCM llbs/bbl | Sphere Diameter MM | Surge Volume bbls. equiv. | Total Volume bbls. equiv. | Seal Thickness In Inches | Mat | Comments |
|---|---|---|---|---|---|---|---|---|
| Interlok In 8% Gel | Coarse Blend | 15 | 15 | 3 | 4 | 1 | 2 | Good Plug |
| Interlok In Invert | Coarse Blend | 15 | 15 | 8 | 8 | 2 | 2 | Poor Plug & Poor Seal |
| Interlok In Invert Viscosified | Coarse Blend | 15 | 15 | 4 | 8 | 1 | 3 | High Leakage Good Seal & Mat |

It will be seen from Table I that:
1. 3 mm buckshot: both Kwik Seal and Interlok coarse blends work well and are comparable products.
2. 10.5 mm marbles - Kwik Seal and Interlok both work well, but Kwik Seal has a higher leakage and surge volume.
3. 15 mm marbles: Interlok is effective, Kwik Seal blows through.
4. 22 mm marbles: Interlok seals and Kwik Seal produces no tendency to seal.
5. 3 mm buckshot: Fine blends of both work well on 3 mm buckshot.

Further it is found that a blend of ½ dried clarifier underflow to ½ straw proved to be the best lost circulation material. The straw length and length distribution were varied next and the best seals were obtained from straw with an even particle size distribution curve from 1 inch to 1½ inch down to dust.

B. SLOT TEST

The slot test gives an indication of the ability of a lost circulation material plug to withstand pressure. Since formation breakdown can occur before the average seal with blowout, this test is not as indicative of a lost circulation material's effectiveness or merits as wedge or sphere test.

The slots were formed from a 3 inches diameter circular disc of ¼ inch thick steel and this disc was machined leaving four to six slots parallel to one another. Each slot was approximately 2 inches long. The widths of the slots in each disc was constant but from disc to disc the slot widths were 1/32 inch, 1/16 inch, ⅛ inch, ¼ inch and ½ inch. The circular discs are attached to the lower end of the cell reservoir 1 in the test cell.

The test itself consisted of placing 30 lb. /barrel equivalent of lost circulation material in 4 percent extended gel in the cell reservoir 1 and slowly increasing the applied pressure. The pressure at which the lost circulation material plug below out was recorded to a maximum pressure of 400 psi. The results are shown in Table II.

TABLE II

| Lost circulation material (LCM) | Particle size of LCM | Conc. of LCM lbs./Bbl. | Largest slot size plugged | Pressure required to blow plug |
|---|---|---|---|---|
| Kwik Seal | Coarse | 30 | 1/8 inch | 250 psi |
| Interlok | Coarse Blend | 30 | 1/4 inch | 200 psi |

It will be seen from Table II that Interlok is a far superior composition to Kwik Seal in being able to plug a much wider slot with the plug withstanding substantial pressures.

C. WEDGE TEST

Vugular and fractured formations can be simulated in the laboratory by means of the wedge test. The wedges were formed as a result of stacking the previously described circular discs, used in the slot test, alternately with the slots at 90° with increasing width of slot from the bottom to the top disc thus providing a wedge shaped slot in the bed 1¼ inches in depth, ½ inch wide at the top and 1/32 inch wide at the bottom. The tests were run with an 8 percent gel high water loss mud and a concentration of 15 lb. /barrel lost circulation material. The cell was pressured to 100 psi and left for 5 minutes. The pressure was raised to 250 psi. and again left for 5 minutes. The pressure was finally raised to 500 psi. and left for an additional 5 minutes. The volume of fluid passing through the test cell was recorded after each time interval. At the conclusion of the experiment the wedge was dismantled and the sizes of the slots plugged by the lost circulation material were recorded and the nature of the seal noted. The results obtained are given in Table III.

TABLE III

WEDGE TEST

| Lost circulation material (LCM) | Particle size of LCM | Conc. of LCM lbs./Bbl. | Slot size | Slot plugged | Volume through at 100 psi | at 250 psi | at 500 psi | Visual comments |
|---|---|---|---|---|---|---|---|---|
| kwik Seal | Coarse | 15 | inch 1/32 | Yes | 50 ml | 20 ml | 20 ml | Fast seal small |
|  |  |  | 1/16 | Yes |  |  |  | Slots sealed |
|  |  |  | 1/8 | No |  |  |  | Large slots not |
| Interlok | Coarse Blend | 15 | 1/32 | Yes | 400 ml | 100 ml | 350 ml | All slots sealed |
|  |  |  | 1/16 | Yes |  |  |  | Very tight plug |
|  |  |  | 1/8 | Yes |  |  |  | Very hard seal |
|  |  |  | 1/4 | Yes |  |  |  |  |
|  |  |  | 1/2 | Yes |  |  |  |  |

It will be seen from Table III that Kwik Seal gives a very tight seal very quickly on 1/32 and 1/16 inch slots but no other slots were sealed at all. Interlok gave a slower seal but all the slots from 1/32 to ½ inch were sealed very tight. The slower seal and the greater leakage worked to advantage giving a much better seal in a larger range of openings. It will be seen from Table 3 that Interlok gives substantially surperior results in the wedge test.

It is found that the composition of the present invention for best efficiency should be used with a high water loss, high solids mud, desirably at a concentration of 15 to 20 lbs. per barrel for serious losses and lower for less serious losses. The addition of the 2 to 4 percent cut straw may be added in an amount of up to 25 percent. It will be seen that the composition of the present invention is inexpensive and readily obtainable and this is a decided advantage due to the large amounts needed. Quick Seal, polyseal, ground rubber and other materials are too expensive to be of general use and wood pulp and straw are much more reasonably priced.

The embodiments of the invention in which an exclusive property or privilege is claimed are defined as follows:

1. In the drilling of a well bore into an underground formation which includes recirculating a drilling fluid through said well bore a method of plugging the porous strata encountered during said drilling which comprises adding to the drilling fluid a mixture of straw and a chemical wood pulp in a weight ratio of 1:9 to 9:1, said mixture being added in an amount sufficient to form a mat on the wall of said well bore adjacent said porous strata to seal said porous strata against passage of fluids therethrough.

2. A method as claimed in claim 1 in which the straw has a uniform particle size distribution in the range 325 mesh to 2 inches.

3. A method as claimed in claim 2 in which the straw includes up to 25 percent of particles in the size range 2 inches to 4 inches.

4. A method as claimed in claim 1 in which the wood pulp is clarifier underflow.

5. A method as claimed in claim 1 in which the ratio of straw to wood pulp is in the range 1:3 to 3:1.

6. A method as claimed in claim 1 in which the ratio of straw to wood pulp is about 1:1.

7. A method as claimed in claim 1 in which the mixture is added to the fluid in an amount of 0.01 weight percent to 10 weight percent based on the total weight of the fluid mixture.

8. A method as claimed in claim 1 in which the mixture is added to the fluid in an amount of 2 to 30 lbs. per barrel.

9. A method as claimed in claim 1 in which the mixture is added to the fluid in an amount from 5 to 25 lbs. per barrel.

10. A composition for use in plugging porous strata encountered during drilling of a well bore in an underground formation, said composition comprising a mixture of straw and a chemical wood pulp in a weight ratio from 1:3 to 3:1, said straw having a uniform particle size distribution in the range 200 mesh to 1½ inches.

11. A composition as claimed in claim 10 in which the weight ratio is about 1:1.

12. A composition as claimed in claim 10 in which the straw includes up to 25 percent by weight of particles in the size range 2 inches to 4 inches.

13. A composition as claimed in claim 10 in which the wood pulp is clarifier underflow.

* * * * *